United States Patent [19]
Echtler

[11] 3,939,709
[45] Feb. 24, 1976

[54] APPARATUS FOR MEASURING THE FLOWRATE OF PARTICULATE SOLID MATERIAL

[75] Inventor: Joseph P. Echtler, Pittsburgh, Pa.

[73] Assignee: Consolidation Coal Company, Pittsburgh, Pa.

[22] Filed: Feb. 4, 1974

[21] Appl. No.: 438,994

[52] U.S. Cl. ................................................. 73/228
[51] Int. Cl.² .......................................... G01F 1/30
[58] Field of Search .................. 73/194 M, 228, 141

[56] References Cited
UNITED STATES PATENTS

| | | | |
|---|---|---|---|
| 2,687,646 | 8/1954 | Goddard | 73/228 |
| 3,056,293 | 10/1962 | Ofner | 73/198 |
| 3,212,330 | 10/1965 | DePollier | 73/228 |
| 3,232,486 | 2/1966 | Ofner | 73/228 X |
| 3,269,181 | 8/1966 | Seay | 73/228 |
| 3,341,794 | 9/1967 | Stedman | 73/141 |
| 3,407,652 | 10/1968 | Schomburg et al. | 73/141 |
| 3,640,136 | 2/1972 | Nolte | 73/228 |

*Primary Examiner*—Herbert Goldstein

[57] ABSTRACT

An expansion chamber having an internal cylindrical wall forming a passageway therethrough includes a vertically positioned upper end portion and a lower end portion disposed angularly relative to the upper end portion. The upper end portion is connected to an inlet portion having a throat which is axially aligned with a vertical duct connected to the inlet portion. Particulate solid material flowing through the vertical duct under the influence of gravity at a substantially constant velocity enters the inlet portion and is directed through the throat into the passageway. An impact member is axially supported by a rod within the passageway in the upper end portion. All the particulate material passing through the throat impinges upon the conical surface of the impact member and is directed therefrom through the annular passage between the lower peripheral edge of the impact member and the internal wall of the expansion chamber. The particulate material exits the expansion chamber through an eccentric outlet provided in the lower end portion which is displaced from vertical alignment with the upper end portion. The rod supporting the impact member is axially positioned within the upper end portion and passes through an opening in the wall of the lower end portion. The bottom tip of the rod rests upon an elastic diaphragm maintained in the sealed pressure system of a load cell positioned externally of the expansion chamber. The momentum of the particulate matter impinging upon the impact member is transmitted therefrom to the rod moving the rod downwardly thereby increasing the pressure exerted by the tip of the rod upon the diaphragm. The change in pressure is instantaneously recorded by the load cell and converted by an electrical recording device to a numerical readout representing the mass flowrate of the particulate material passing through the vertical duct.

7 Claims, 2 Drawing Figures

APPARATUS FOR MEASURING THE FLOWRATE OF PARTICULATE SOLID MATERIAL

BACKGROUND OF THE INVENTION

1. Field of the Invention

This invention relates to apparatus for measuring the flowrate of particulate solid material and more particularly to apparatus for instantaneously measuring the momentum of the particulate solids while flowing at a substantially constant velocity.

2. Description of the Prior Art

In the process of making metallurgical coke from coal and other carbonaceous material, it is necessary to determine the mass flowrate of particulate solids such as feed streams and product streams as well as intermediate streams whose instantaneous flowrate must be determined for proper regulation of the other process values. Because the particulate solids have a spectrum of sizes and densities the flowrate measurement must be independent of size and density. Furthermore, difficulty is encountered in measuring flowrates of particulate solids at the elevated temperatures present in the coking process.

There is need for a solids flowrate measuring device that will accurately measure the flowrate of solid particulate material at elevated temperatures in any hostile environment without interrupting the flow of the particulate solids. The apparatus must be simple in design and rugged enough to withstand the elevated temperatures, high rates of flow and noxious gases present in the hostile environment. In addition, the apparatus must instantaneously and accurately measure high rates of flow and increases and decreases in the rate of flow of the particulate solids.

SUMMARY OF THE INVENTION

In accordance with the present invention there is provided apparatus for measuring the flowrate of particulate solid material moving vertically downwardly under the influence of gravity comprising an expansion chamber having an internal surface with a passageway therethrough. The expansion chamber includes an upper end portion with an inlet therethrough and a lower end portion with an outlet therethrough. The lower end portion is disposed angularly relative to the upper end portion. An impact member is axially positioned in the upper end portion and has a cross-sectional area greater than that of the inlet of the upper end portion. A vertical rod supports the impact member axially in the upper end portion and extends through an opening in the wall of the expansion member lower end portion. A responsive device is linked with the rod and is positioned externally of the expansion member passageway. The particulate solid material flowing through the inlet of the upper end portion and impinging on the impact member moves the impact member and the rod downwardly to actuate the responsive device and thus provide an instantaneous indication of the momentum of the particulate solid material passing through the expansion chamber.

The pressure responsive device includes an elastic diaphragm maintained in the sealed pressure system of a load cell which is operatively associated with a pressure measuring and indicating reader or recorder. The pressure measuring indicating reader or recorder converts electric signals transmitted by the load cell in response to the impact of the particulate solid material impinging upon the impact member to a visual indication of the impact stress exerted upon the impact member. The recorded impact stress is expressed in terms of the mass flowrate of the particulate solid material flowing through the expansion chamber.

With this arrangement particulate solid material falling freely under the influence of gravity will have a uniform velocity which is directly related to the fixed vertical distance of fall of the particulate solids. The momentum of each particle is determined by its mass and velocity. Thus, the stress applied to the impact member, as a consequence of the falling particulate solid material, is directly related to the instantaneous flowrate of the particulates. The flowrate of the particulate solid material moving solely under the influence of gravity is then determined by the present invention independently of the density and temperature of the particulate solids and further independently of the absolute pressure of the environment in which the particulate solids are contained.

Accordingly, the principal object of this invention is to provide a simple and rugged apparatus which reliably measures the mass flowrate of high temperature particulate solids moving under the influence of gravity.

Another object of this invention is to provide a pressure-sensitive recording device suitable for recording the mass flowrate of particulate solid material, irrespective of the density of the particulate solid material.

A further object of this invention is to provide an apparatus for measuring the mass flowrate of hot particulate solid material which includes a pressure-sensitive device positioned remotely of the hot particulate stream to thereby reduce the deleterious effects attributed to the excessive temperature.

Still another object of the present invention is to provide an apparatus capable of instantaneously and reliably measuring the mass flowrate of particulate solid material subjected to an elevated temperature in a hostile environment containing noxious gases.

These and other objects and advantages of this invention will be more completely disclosed and described in the following specification, the accompanying drawings and the appended claims.

DESCRIPTION OF THE PREFERRED EMBODIMENTS

Figure 1:
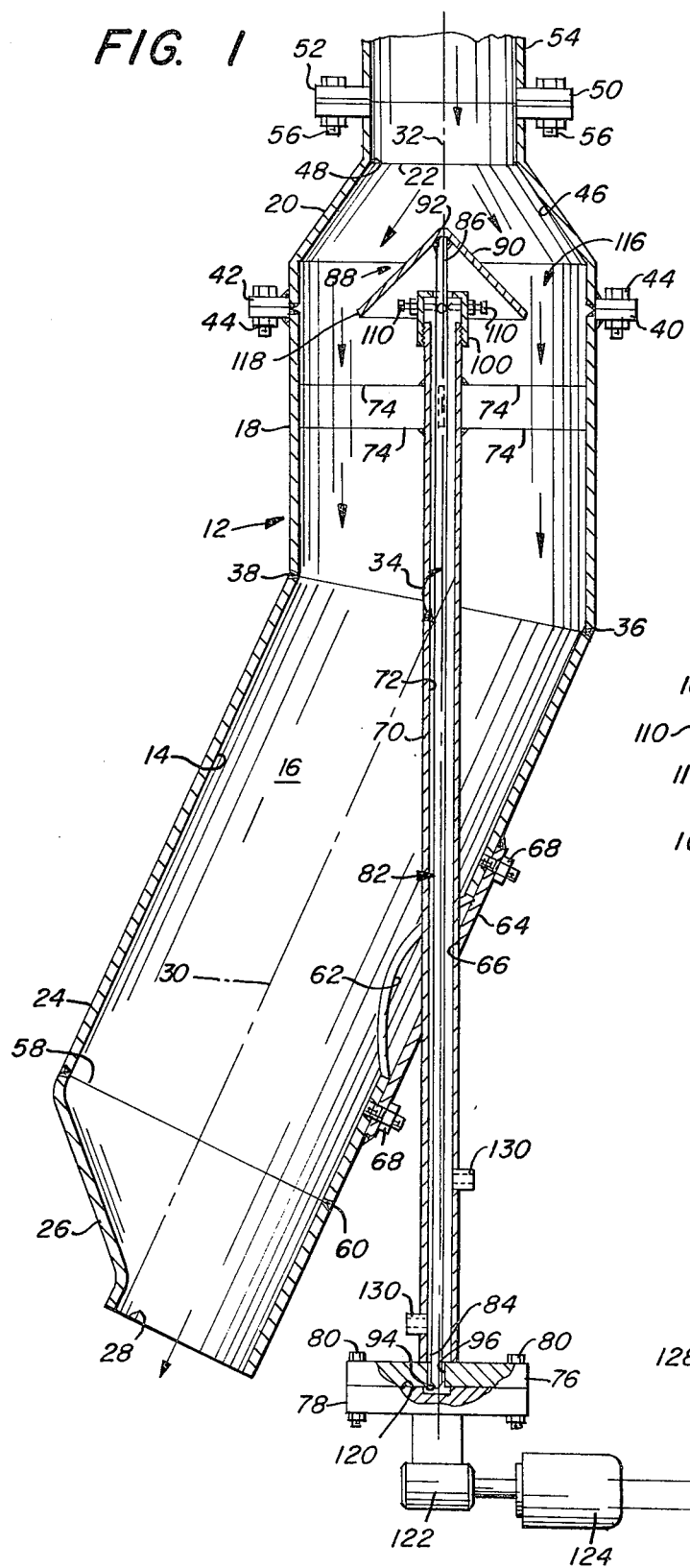
FIG. 1 is a sectional view in side elevation, illustrating the apparatus for measuring the flowrate of particulate solid material.

Referring to the drawings, there is illustrated in FIG. 1 an apparatus for measuring the flowrate of particulate solid material generally designated by the numeral 10 which includes an expansion chamber 12 having an internal cylindrical wall 14 forming the passageway 16. The expansion chamber 12 has an upper end portion 18 with an inlet portion 20 having an axial opening 22 and a lower end portion 24 having an outlet portion 26 with the eccentric opening 28.

The lower end portion 24 has a longitudinal axis 30 which is disposed angularly from vertical alignment with the longitudinal axis 32 of the upper end portion 18 to thereby form the obtuse angle 34 with the axis 30. The upper end portion 18 of the expansion chamber 12 includes a lower annular edge 36 inclined from a horizontal plane passing through the upper end portion 18. The lower end portion 24 includes an upper annular edge 38 that is welded to the lower annular edge 36 of the upper end portion 18 and thereby provides a sealed connection between the upper end portion 18 and the lower end portion 24.

The upper end portion 18 includes a circular flange 40 having vertical bores therethrough. The inlet portion 20 is provided with a lower circular flange 42 having vertical bores therethrough and is aligned with the vertical bores of the flange 40 so that bolts 44 pass through the aligned bores of the flanges 40 and 42 to thereby connect the upper end portion 18 to the inlet portion 20. The cylindrical wall 46 of the inlet portion 20 converges inwardly and upwardly from the upper end portion 18 to form a throat 48 in the inlet portion 20. The cylindrical wall 46 terminates in an upper circular flange 50 which has vertical bores aligned with the vertical bores of a circular flange 52 of a vertical duct 54. Bolts 56 engaged within the vertically aligned bores of the flanges 50 and 52 connect the vertical duct 54 to the inlet portion 20.

The outlet portion 26 of the expansion chamber 12 is provided with the eccentric opening 28 and an inlet 58 and is connected to the bottom portion of the cylindrical wall 14 by a continuous weld 60. With this arrangement, particulate solid material entering the inlet portion 20 from the vertical duct 54 and falling under the influence of gravity passes freely through the expansion chamber 12 and exits through the eccentric opening 28 without obstruction to the travel of the particulate solids through the expansion chamber 12. Thus, the velocity of the particulate is maintained substantially constant.

The lower end portion 24 of the expansion chamber 12 includes an opening 62 provided in the cylindrical wall 14 through which passes the vertical extension of the longitudinal axis 32 of the upper end portion 18 and the vertical duct 54. A cover plate 64 having a bore 66 axially aligned with the longitudinal axis 32 is secured to the cylindrical wall 14 by the nut and bolt combinations 68. An elongated tubular member 70 having a central bore 72 is axially aligned with the upper end portion 18 and passes vertically through the opening 62 of the lower end portion 24 and the bore 66 of the cover plate 64.

The top portion of the tubular member 70 is maintained in axial alignment within the upper end portion 18 by a plurality of radially extending strut members 74 suitably connected at one end to the outer surface of the tubular member 70 and at the other end to the cylindrical wall 14. The bottom portion of the tubular member 70 is rigidly mounted externally of the expansion chamber 12 to a base plate 76 which is positioned in overlying relation with a support plate 78. The base plate 76 is secured to the support plate 78 by nut and bolt combinations 80 which extend through aligned bores in the plates 76 and 78 and in combination with the lateral strut members 74 serve to maintain the tubular member 70 rigidly supported in the expansion chamber 12 and axially aligned with the longitudinal axis 32.

Centrally positioned within the bore 72 of the tubular member 70 is a vertical rod 82 having a top tip 86, extending beyond the bore 72, upon which is rigidly secured an impact member generally designated by the numeral 88. The impact member 88 has the external configuration of a frustoconical cone with an arcuate surface 90 which diverges outwardly and downwardly from a vertex 92. The vertex 92 is coaxially aligned with the longitudinal axis 32 and is securely connected to the top tip 86 of the rod 82. The bottom tip 84 of the rod 82 has a conical tapered point 94 retained within a central bore 96 of the base plate 76.

Figure 2:
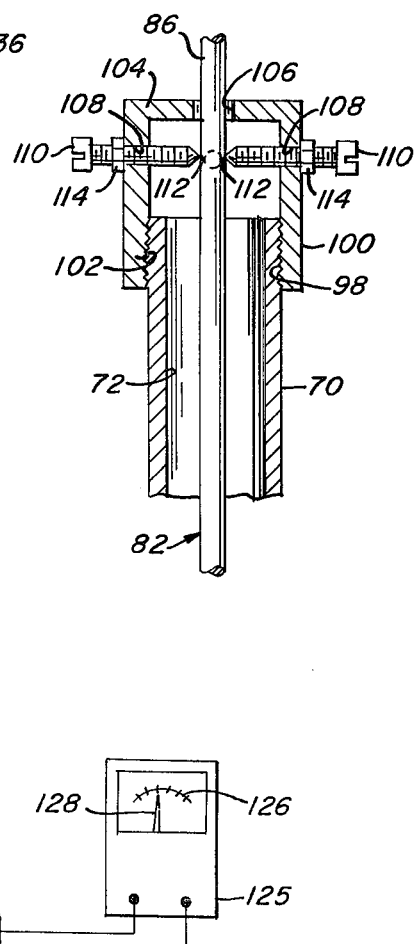
FIG. 2 is an enlarged fragmentary view, illustrating the top portion of the sensing rod positioned in the upper end portion of the expansion chamber according to the present invention.

The tubular member 70 is provided with an externally threaded upper end portion 98, as illustrated in FIG. 2. A sleeve 100 has an elongated body portion with internally threaded lower end portion 102 arranged to engage the threaded upper end portion 98. The sleeve 100 is provided with a horizontal top surface 104 having an annular opening 106 through which passes the rod top tip 86. The elongated body portion of the sleeve 100 includes a plurality of radially extending threaded bores 108. Set screws 110 extend through the bores 108 so that the end portions 112 abut the surface of the rod 82. Lock nuts 114 frictionally engage the outer surface of the sleeve 100 so that the set screws 110 are maintained immovable within the threaded bores 108 and in abutting contact with rod 82. With this arrangement, the set screws 110 maintain axial alignment of the rod 82 with the longitudinal axis 32 in the tubular member 70.

In operation, a stream of particulate solid material, such as particulate char, is directly discharged from a char heater at a temperature of about 1,000°F. to a char feeder (not shown). From the char feeder the hot char particles flow downwardly under the influence of gravity through the vertical duct 54 and the throat 48 into the inlet portion 20 of the expansion chamber 12 where all of the particulate solids impinge upon the surface of the impact member 88. Thereafter, the particulate solids are directed through an annular passage 116 provided between the lower peripheral edge 118 of the impact member 88 and the cylindrical wall 14 of the expansion chamber 12 in the direction generally indicated by the arrows in FIG. 1.

The passageway 16 of the expansion chamber 12 must provide a cross-sectional area in the annular passage 116 sufficient to permit the unobstructed downward flow of particulate solids therethrough. Preferably, the diameter of the impact member 88 at the base portion defined by the peripheral edge 118 must be greater than the diameter of the throat 48 to thereby assure impingement of all of the particulate solids flowing through the throat 48 upon the impact member 88. Thus, the cross-sectional area of the passageway 116 at the peripheral edge 118 should be at least 1.5 times the cross-sectional area of the throat 48 and preferably somewhat larger.

Once the particulate solids pass through the annular passage 116, they fall through the upper end portion 18 into the lower end portion 24 through the passageway 16 and exit through the eccentric opening 28 of the outlet portion 26 for further processing. The eccentric arrangement of the opening 28 in the outlet portion 26 assures that all of the particulate solids flowing downwardly through the passage 16 under the influence of gravity will flow continuously in an unobstructed manner through the expansion chamber 12 so that the flow-rate through the annular passage 116 remains constant. With this arrangement, the particulate solids flow at a substantially uniform velocity under the influence of gravity through the expansion chamber 12. Furthermore, the substantially vertical wall of the cover plate bore 66 sealingly abuts the surface of the tubular member 70 to thereby prevent the escape of particulate solids and noxious gases entrained in the particulate flow through the opening 62 of the lower end portion 24.

The conical tapered bottom tip 84 of the rod 82 is positioned in abutting relationship with the surface of a pressure-sensitive element, such as an elastic diaphragm 120 of a pressure responsive device 122. The pressure responsive device 122 is, preferably, a conventional load cell, having a fluid pressure chamber communicating with the sealed internal chamber of the support plate 78. The elastic diaphragm 120 is securely positioned between the co-planar surfaces of the plates 76 and 78 and together therewith form a sealed pressure system within the load cell 122. Downward movement of the rod 82 increases the pressure of the bottom tip 84 upon the elastic diaphragm 120. Depression of the diaphragm 120, in turn, will increase the pressure upon the fluid behind the diaphragm contained within the sealed pressured system of the load cell 122. The load cell 122 is electrically connected to a suitable recording device 124 operatively associated with a meter 125 having a graduated scale 126 and a meter pointer 128.

All the solid particulates entering the expansion chamber 12 fall freely from rest under the influence of gravity. Accordingly, each particle of solid material will enter the throat 48 traveling at a uniform velocity which is directly related to the distance of fall and independent of the density of the solid material. Thus, the particulate solid stream flowing freely through the vertical duct 54 strikes the impact member 88 at essentially a constant velocity. Falling a vertical distance under the influence of gravity, each particle of solid material acquires momentum dependent upon the mass of the respective particle and the velocity at which it is traveling. Thus, the momentum of the particulate solid flow through the expansion chamber 12 is directly related to the instantaneous flowrate of the particulate solid flow.

The particulate flow applies impact forces upon the surface of the impact member 88 and the stresses are transmitted therefrom to the rod 82 and through the rod 82 to the bottom tip 84 resting upon the diaphragm 120. The downward displacement of the rod bottom tip 84 increases the pressure upon the diaphragm 120. The pressure upon the fluid contained within the sealed pressure system of the load cell 122 is, accordingly, increased. The change in pressure within the load cell 122 is directly proportional to the momentum of the particulate solid flow and the impact forces transmitted by the particulate solids to the impact member 88 in addition to the mass flowrate of the particulate solids through the expansion chamber 12.

The increase in pressure applied to the fluid within the load cell 122 actuates the load cell 122 to transmit an electrical signal to the recording device 124. Any suitable load cell or pressure transducer which is operable to differentiate between increases and decreases in pressure from a given reference pressure is suitable for use in the present invention. The pressure range covered by any of the available diaphragm type transducers, such as a variable reluctance transducer, capacitive pressure transducer or piezoelectric transducer are, of course, governed by the stiffness of the pressure element.

The load cell 124 converts the change in the fluid pressure of the sealed pressure system resulting in the downward displacement of the rod 82 upon the diaphragm 120 to a corresponding electrical signal which becomes the input signal to the recording device 124. The recording device 124 is calibrated to instantaneously convert the input signal of the load cell 122 to an output signal which drives the meter 125. The pointer 128 provides a visible indication of the mass flowrate of the particulate solids on the graduated scale 126. Because the momentum of each particle of solid material varies only with the mass thereof, since the particles are falling at substantially uniform velocity, a linear readout is possible. The mass flowrate of the particulate solids may be indicated on the scale 126 in tons per minute, pounds per minute and the like.

The above described apparatus is operable to accurately measure with a high degree of reliability the flowrates of particulate solid material in a hostile environment of elevated temperatures and an atmosphere of noxious gases. During testing of the apparatus, no deviation, from the linear relationship between the momentum of each particle of solid material and the respective mass flowrate was recorded for particulate flow at temperatures in the range of 500°F. to 1,000°F. and at flowrates up to about 2,400 pounds per hour with a vertical duct diameter of 6 inches and an expansion chamber diameter of 12 inches.

It will be apparent from the above described apparatus that positioning the diaphragm and the load cell 122 remote of the flow of the hot particulate solid material reduces the deleterious effects of the hostile environment of the solids upon the sensitivity of the load cell 122 and the corresponding reading recorded by the recording device 124. Even though the diaphragm 120 is positioned externally of the expansion chamber 12, a linear response of the diaphragm 120 to the impact of the particulate solid flow upon the impact member 88 would not be possible absent complex mechanical linkages, if the lower end portion 24 was axially aligned with the upper end portion 18.

The provision of the cover plate 64 to seal the space between the opening 62 of the lower end portion 24 and the tubular member 70 prevents the escape of noxious gases, which may be present in the hostile environment of the particulate flow, from the chamber 12. Also, the cover plate 64 serves to absorb and distribute uniformly the thermal stresses applied to the lower end portion 24 by the elevated temperatures of particulate solid material. To this end, the cover plate 64 functions to eliminate hot spots in the lower end portion 24 and thereby prevent the transfer of heat from the lower end portion 24 to the tubular member 70 and the rod 82 positioned therein. In addition, the tubular member 70 is provided with air valves 130 which communicate with the central bore 72 and may be connected to a suitable pressure device for balancing a pressure gradient which may exist between the pressure within the bore 72 and the expansion chamber 12. With this arrangement, static pressure is balanced to preserve the linear relationship between momentum transferred by the particulate solids to the impact member 88 and the flowrate indicated by the meter 125. Thus, the above described apparatus for measuring the flowrate of particulate solid material provides an instantaneous indication of the flowrate of high temperature solids which are constantly subjected to wide ranges of temperature and pressure in any hostile environment.

According to the provisions of the patent statutes, I have explained the principle, preferred construction and mode of operation of my invention and have illustrated and described what I now consider to represent its best embodiments. However, I desire to have it understood that, within the scope of the appended claims, the invention may be practiced otherwise than as specifically illustrated and described.

I claim:

1. Apparatus for measuring the flowrate of particulate solid material moving vertically downwardly comprising, an expansion chamber having an internal surface with a passageway therethrough, said expansion chamber having an upper end portion with an inlet therethrough and a lower end portion with an outlet therethrough, said inlet converging inwardly and upwardly from said upper end portion to form a throat for receiving the flow of the particulate solid material, said lower end portion disposed angularly relative to said upper end portion and having an opening coaxially aligned with said upper end portion, an impact member axially positioned in said upper end portion and having a cross-sectional area greater than that of said upper end portion inlet, a rod coaxially aligned with said upper end portion and extending through said opening in said lower end portion, said rod having a top portion supporting said impact member within said throat of said upper end portion inlet so that substantially the entire flow of particulate solid material passing through said throat impinges upon said impact member, responsive means positioned externally of said expansion chamber passageway, said rod having a bottom portion in contact with said responsive means externally of said expansion chamber, said responsive means operable to instantaneously measure the momentum of said particulate solid material flowing through said upper end portion inlet throat and impinging upon said impact member, a tubular member concentrically surrounding said rod and passing through said lower end portion opening to permit vertical reciprocal movement of said rod relative to said tubular member, said tubular member having an upper end portion positioned below said rod top portion and a lower end portion securely positioned in contact with said responsive means with said rod bottom portion extending beyond said tubular member, said tubular member positioned in a fluid-tight relationship with said opening of said expansion chamber lower end portion, means for maintaining axial alignment of said tubular member in said expansion chamber upper end portion, means positioned adjacent said impact member for centering said rod within said tubular member having a sleeve threadedly engaged to said tubular member, said sleeve having a top surface with an annular opening through which said rod passes, a plurality of adjustment screws extending through said sleeve and having end portions positioned in abutting contact with said rod, and locking means for selectively positioning said adjustment screws relative to said sleeve.

2. Apparatus for measuring the flowrate of particulate solid material moving vertically downwardly as set forth in claim 1 in which said means for maintaining axial alignment of said tubular member includes, a plurality of lateral strut members secured to said expansion chamber internal surface within said expansion chamber upper end portion, and each of said lateral strut members extending radially inwardly transverse to said passageway and connected to said tubular member.

3. Apparatus for measuring the flowrate of particulate solid material moving vertically downwardly as set forth in claim 1 in which said impact member includes, a frustoconical cone having a vertex positioned on said supporting means within said expansion chamber upper end portion, said frustoconical cone having a central axis coaxially aligned with the axis of said expansion chamber upper end portion positioned in said throat of said upper end portion inlet, and said frustoconical cone having a downwardly extending arcuate surface arranged to receive the entire impact of said particulate solid material flowing through said expansion chamber upper end portion.

4. Apparatus for measuring the flowrate of particulate solid material moving vertically downwardly as set forth in claim 1 in which said responsive means includes, a first plate member having an opening therein arranged to receive said supporting means, a second plate member having an internal chamber and connected in underlying relationship with said first plate member, a pressure sensitive element contained in said internal chamber, said pressure sensitive element being coaxially positioned and maintained in abutting relationship with said supporting means, and said pressure sensitive element responsive to downward displacement of said impact member to transmit a corresponding electrical signal.

5. Apparatus for measuring the flowrate of particulate solid material moving vertically downwardly as set forth in claim 4 which includes, a meter means for converting the response of said pressure sensitive element to the downward displacement of said impact member to a visible indication of the flowrate of said particulate solid material passing through said expansion chamber.

6. Apparatus for measuring the flowrate of particulate solid material moving vertically downwardly as set forth in claim 4 in which said pressure sensitive element includes, a load cell having an elastic diaphragm maintained in abutting relationship with said supporting means, and said load cell actuated by displacement of said diaphragm in response to the linear downward displacement of said impact member to transmit electrical signals corresponding to the degree of displacement of said diaphragm.

7. Apparatus for measuring the flowrate of particulate solid material moving vertically downwardly comprising, an expansion chamber having an internal surface with a passageway therethrough, said expansion chamber having an upper end portion with an inlet therethrough and a lower end portion with an outlet therethrough, said inlet converging inwardly and upwardly from said upper end portion to form a throat for receiving the flow of the particulate solid material, said lower end portion disposed angularly relative to said upper end portion and having an opening coaxially aligned with said upper end portion, an impact member axially positioned in said upper end portion and having a cross-sectional area greater than that of said upper end portion inlet, a rod coaxially aligned with said upper end portion and extending through said opening in said lower end portion, said rod having a top portion supporting said impact member within said throat of said upper end portion inlet so that substantially the entire flow of particulate solid material passing through said throat impinges upon said impact member, responsive means positioned externally of said expansion chamber passageway, said rod having a bottom portion in contact with said responsive means externally of said expansion chamber, said responsive means operable to instantaneously measure the momentum of said particulate solid material flowing through said upper end portion inlet throat and impinging on said impact member, a tubular member concentrically surrounding said rod and passing through said lower end portion opening to permit vertical reciprocal movement of said rod relative to said tubular member, said tubular member having an upper end portion positioned below said rod top portion and a lower end portion securely positioned in contact with said responsive means with said rod bottom portion extending beyond said tubular member, said tubular member positioned in a fluid-tight relationship with said opening of said expansion chamber lower end portion, means for maintaining axial alignment of said tubular member in said expansion chamber upper end portion, a plurality of lateral strut members secured to said expansion chamber internal surface within said expansion chamber upper end portion, and each of said lateral strut members extending radially inwardly transverse to said passageway and connected to said tubular member.

* * * * *